US012343912B2

(12) United States Patent
Murphy et al.

(10) Patent No.: US 12,343,912 B2
(45) Date of Patent: Jul. 1, 2025

(54) TUBING COUPLER MOLDINGS AND SYSTEMS, AND ASSOCIATED METHODS

(71) Applicant: Repligen Corporation, Waltham, MA (US)

(72) Inventors: Stephen Murphy, Foulksmills (IE); Christopher Bullock, Moorpark, CA (US)

(73) Assignee: Repligen Corporation, Waltham, MA (US)

( * ) Notice: Subject to any disclaimer, the term of this patent is extended or adjusted under 35 U.S.C. 154(b) by 198 days.

(21) Appl. No.: 18/084,655

(22) Filed: Dec. 20, 2022

(65) Prior Publication Data

US 2023/0191671 A1    Jun. 22, 2023

Related U.S. Application Data

(60) Provisional application No. 63/292,232, filed on Dec. 21, 2021.

(51) Int. Cl.
| | |
|---|---|
| B29C 45/14 | (2006.01) |
| B29C 45/26 | (2006.01) |
| B29C 65/00 | (2006.01) |
| B29L 31/24 | (2006.01) |

(52) U.S. Cl.
CPC .. B29C 45/14467 (2013.01); B29C 45/14065 (2013.01); B29C 45/2612 (2013.01); B29C 45/2669 (2013.01); B29C 66/5221 (2013.01); B29C 2045/14524 (2013.01); B29C 2045/1454 (2013.01); B29L 2031/24 (2013.01)

(58) Field of Classification Search
CPC .... B29C 45/14065; B29C 2045/14524; B29C 2045/1454; B29C 66/5221

USPC ...................... 264/261, 277, 328.1
See application file for complete search history.

(56) References Cited

U.S. PATENT DOCUMENTS

| | | | | |
|---|---|---|---|---|
| 3,068,513 | A | * | 12/1962 | Chaffin ................. B29C 48/475 264/261 |
| 4,662,307 | A | * | 5/1987 | Amos .................. G02B 6/2558 264/275 X |
| 5,538,578 | A | * | 7/1996 | Sugawara ........... B29C 66/1142 264/261 |

(Continued)

OTHER PUBLICATIONS

International Search Report and Written Opinion for the International Patent Application No. PCT/US2022/053449, mailed Apr. 28, 2023, 15 pages.

*Primary Examiner* — Leo B Tentoni
(74) *Attorney, Agent, or Firm* — KDW Firm PLLC

(57) ABSTRACT

A tubing system with a coupler join positioned between and joining tubing segments. The coupler join is formed to reduce dead legs and hold up volumes within, and/or to reduce materials used to form, and/or to simplify the manufacturing process of the tubing system. The coupler join may be sized, shaped, configured, and/or dimensioned to join tubing segments, such as pre-formed tubing segments, in a streamlined configuration, such as to substantially correspond with the outer and inner diameters of the tubing segments. The tubing system and coupler join may be formed with a mold configured to form a coupler join securely coupling spaced apart ends of tubing segments to be joined together in a configuration which reduces dead legs and hold up volumes within the resulting tubing system.

6 Claims, 7 Drawing Sheets

(56) References Cited

U.S. PATENT DOCUMENTS

| | | | |
|---|---|---|---|
| 6,432,345 B1 | 8/2002 | Warburton-Pitt | |
| 7,718,106 B2 * | 5/2010 | Spencer | B29C 66/5221 |
| | | | 264/261 X |
| 2004/0195833 A1 | 10/2004 | Zoellner | |
| 2008/0097396 A1 | 4/2008 | Spencer | |
| 2013/0030389 A1 | 1/2013 | Hamilton | |
| 2018/0274689 A1 | 9/2018 | Gagne | |

\* cited by examiner

TUBING COUPLER MOLDINGS AND SYSTEMS, AND ASSOCIATED METHODS

CROSS-REFERENCE TO RELATED APPLICATIONS

The is a non-provisional of pending provisional patent application Ser. No. 63/292,232, filed on Dec. 21, 2021, the entirety of which application is incorporated by reference herein.

FIELD

The present disclosure relates generally to the field of tubing assemblies. More particularly, the present disclosure relates to devices, systems, and methods for improving coupling of tubing segments or fittings. The present disclosure may particularly relate to devices, systems, and methods for coupling tubing for use with pharmaceutical, biopharmaceutical, biotechnological, bioprocess, food, or beverage use or applications.

BACKGROUND

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, or complex combinations of these substances, and may even include living entities such as cells. In order to produce biologics on a commercial scale, sophisticated and expensive equipment is needed. In both pharmaceutical and biologics, for example, various processes need to occur before the final product is obtained. For example, in the case of biologics, cells may be grown in a chamber or vessel, such as a bioreactor or the like, and nutrients may need to be carefully modulated into the chamber or vessel. Waste products produced by cells may also have to be removed on a controlled basis from the chamber or vessel. As another example, biologic products produced by living cells or other organisms may need to be extracted and concentrated. This process may involve a variety of filtration and separation techniques.

Because there are a number of individual processes required to produce the final product, various reactants, solutions, and washes are often pumped or otherwise transported to various subsystems using conduits and associated valves. These systems may be quite cumbersome and organizationally complex due to the large numbers of conduits, valves, sensors, and the like that may be needed in such systems. Not only are these systems visually complex (e.g., with various pathways crossing one another), but they also include many components that are required to be sterilized between uses to avoid cross-contamination issues. Indeed, in the case of drug and biologic preparation, the Federal Food and Drug Administration (FDA) imposes strict requirements with regard to cleaning, sterilization, or bio-burden reduction procedures that are required for drug and pharmaceutical preparations. This is particularly a concern because many of these products are produced in batches which would require repeated cleaning, sterilization, or bio-burden reduction activities on a variety of components.

Disposable solutions have been proposed that utilize flexible (e.g., silicone) tubing during the manufacturing process. Such disposable flexible tubing may be discarded after use (i.e., are single-use tubing) and replaced with new tubing, thereby avoiding the need to sterilize some or all of the equipment. For valve operations, the flexible tubing is placed inside a two-piece valve, and a valve actuator is used to selectively pinch the flexible tubing. The valve is closed when the flexible tubing is pinched shut by the valve actuator, and opened when the actuator allows the flexible tubing to be in the resting, open state (such as by being released from pinching contact with each other).

The fluids processed in pharmaceutical, biopharmaceutical, bioprocess, etc., applications (e.g., cellular products or bioproducts, drugs, etc.) may be very valuable (e.g., difficult and/or costly to develop). Accordingly, it is desirable to minimize, and preferably even eliminate, any holdup volume within the tubing, such as adjacent a valve closure and/or branch of tubing along fluid pathways (e.g., between components, processes, etc.). Moreover, holdup volume areas can contain residual fluid and/or reagents that can contaminate or adversely affect other processes taking place in the manufacturing operation, potentially adversely affecting the nature and/or yield of the product. Furthermore, it may be important to have as little impedance to the flow path of the materials through the tubing, so that the fluid flow may be carefully controlled and the potentially delicate materials not affected by the flow path.

SUMMARY

This summary of the disclosure is given to aid understanding, and one of skill in the art will understand that each of the various aspects and features of the disclosure may advantageously be used separately in some instances, or in combination with other aspects and features of the disclosure in other instances. No limitation as to the scope of the claimed subject matter is intended by either the inclusion or non-inclusion of elements, components, or the like in this summary.

In accordance with various principles of the present disclosure, a tubing assembly includes a first tubing segment; a second tubing segment; and a coupler join formed between said first tubing segment and said second tubing segment, the coupler join having a first outer diameter at a first end thereof substantially equal to the outer diameter of the first tubing segment, and a second outer diameter at a second end thereof substantially equal to the outer diameter of the second tubing segment.

In some embodiments, the first tubing segment, the second tubing segment, and the coupler join are flexible and compressible to substantially the same extent.

In some embodiments, the coupler join is formed between the first tubing segment and the second tubing segment, the first tubing segment and the second tubing segment being preformed prior to formation of the coupler join therebetween.

In some embodiments, the coupler join is formed by injection molding material forming the coupler join between the first tubing segment and the second tubing segment.

In some embodiments, the outer diameter of the first tubing segment is equal to the outer diameter of the second tubing segment.

In some embodiments, the outer diameter of the first tubing segment is greater than the outer diameter of the second tubing segment.

In some embodiments, the coupler join has a first inner diameter at the first end thereof substantially equal to the inner diameter of the first tubing segment, and a second outer diameter at the second end thereof substantially equal to the inner diameter of the second tubing segment. In some embodiments, the first inner diameter is substantially equal to the second inner diameter. In some embodiments, the first inner diameter is larger than the second inner diameter.

In accordance with various principles of the present disclosure, a mold for forming a tubing assembly includes a first molding half and a second molding half, wherein each of the first molding half and the second molding half comprises a first tubing segment region, a second tubing segment region, and a coupler region between the first tubing segment region and the second tubing segment region, the outer configuration of the coupler region being formed so that a coupler join molded therein has a finished outer configuration matching pre-formed first and second tubing segments positioned within the mold during formation of the coupler join.

In some embodiments, the coupler join molded within a mold formed in accordance with various principles of the present disclosure does not extend over the outer surfaces of first and second tubing segments positioned within the mold during formation of the coupler join.

In some embodiments, the coupler region of the first molding half and the second molding half is deeper than the first tubing segment region and the second tubing segment region of the first molding half and the second molding half.

In some embodiments, each of the first molding half and the second molding half further comprises a nozzle seating configured to hold an injection nozzle in place to inject flowable material for forming the coupler join, and a flash vent configured to allow excess flowable material to exit said coupler region of the first molding half and the second molding half.

In accordance with various principles of the present disclosure, a method of forming a tubing assembly of at least one tubing segment coupled to another tubing segment with a coupler join includes seating ends of a first tubing segment and a second tubing segment within a mold with a gap therebetween, injecting flowable material into the gap between the first tubing segment and the second tubing segment, and curing the flowable material to form a coupler join joining the ends of the first tubing segment and the second tubing segment without extending over the exteriors of the first tubing segment and the second tubing segment.

In some aspects of the method, the gap between the first tubing segment and the second tubing segment is formed by a molding region within the mold deeper than the molding regions in which the first tubing segment and the second tubing segment are seated, and the flowable material is selected such that the method further comprises curing the flowable material to form a coupler join with an outer configuration matching the outer configurations of the first tubing segment and the second tubing segment.

In some embodiments, the method further comprises inserting a mandrel into passageways through the first tubing segment and the second tubing segment; extending a portion of the mandrel outside the first tubing segment and the second tubing segment and across the gap between the first tubing segment and the second tubing segment; and injecting the flowable material into the gap and over the portion of the mandrel extending outside the first tubing segment and the second tubing segment.

In some embodiments, the method further comprises stretching the first tubing segment and the second tubing segment to fit over the mandrel.

In some embodiments, the method further comprises positioning a circumferential gap of the mandrel in the gap between the first tubing segment and the second tubing segment.

These and other features and advantages of the present disclosure, will be readily apparent from the following detailed description, the scope of the claimed invention being set out in the appended claims. While the following disclosure is presented in terms of aspects or embodiments, it should be appreciated that individual aspects can be claimed separately or in combination with aspects and features of that embodiment or any other embodiment.

BRIEF DESCRIPTION OF THE DRAWINGS

Non-limiting embodiments of the present disclosure are described by way of example with reference to the accompanying drawings, which are schematic and not intended to be drawn to scale. The accompanying drawings are provided for purposes of illustration only, and the dimensions, positions, order, and relative sizes reflected in the figures in the drawings may vary. For example, devices may be enlarged so that detail is. In the figures, identical or nearly identical or equivalent elements are typically represented by the same reference characters, and similar elements are typically designated with similar reference numbers differing in increments of 100, with redundant description omitted. For purposes of clarity and simplicity, not every element is labeled in every figure, nor is every element of each embodiment shown where illustration is not necessary to allow those of ordinary skill in the art to understand the disclosure.

The detailed description will be better understood in conjunction with the accompanying drawings, wherein like reference characters represent like elements, as follows:

FIG. 4A illustrates a perspective view of a mold such as illustrated in FIG. 3, with tubing segments and a mandrel positioned therein in preparation for formation of a coupler between the tubing segments, while

DETAILED DESCRIPTION

Figure 1:
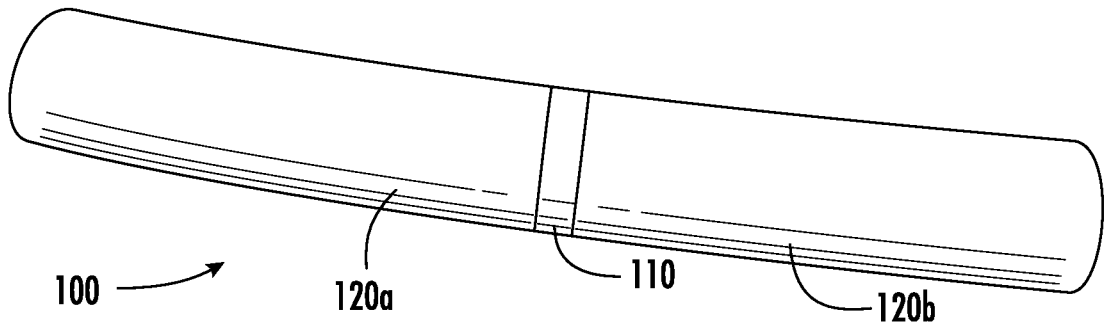
FIG. 1 illustrates a perspective view of two separately formed tubing segments joined in accordance with various principles of the present disclosure.

The following detailed description should be read with reference to the drawings, which depict illustrative embodiments. It is to be understood that the disclosure is not limited to the particular embodiments described, as such may vary. All apparatuses and systems and methods discussed herein are examples of apparatuses and/or systems and/or methods implemented in accordance with one or more principles of this disclosure. Each example of an embodiment is provided by way of explanation and is not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

It will be appreciated that the present disclosure is set forth in various levels of detail in this application. In certain instances, details that are not necessary for one of ordinary skill in the art to understand the disclosure, or that render other details difficult to perceive may have been omitted. The terminology used herein is for the purpose of describing particular embodiments only, and is not intended to be limiting beyond the scope of the appended claims. Unless defined otherwise, technical terms used herein are to be understood as commonly understood by one of ordinary skill in the art to which the disclosure belongs. For instance, as used herein, a "free end" of an element is a terminal end at which such element does not extend beyond. As used herein, an "internal passage" or "internal passageway" or "bore" is not limited to a circular cross-section. It will be appreciated that all of the devices and/or methods disclosed and claimed herein can be made and executed without undue experimentation in light of the present disclosure.

In accordance with various principles of the present disclosure, a coupler join is formed to couple two tubing segments in a generally end-to-end configuration in a manner which, among various other benefits, reduces dead legs and hold-up volumes, and/or reduces materials for the finished product as well as components and assemblies in which the finished product may be used, and/or simplifies the manufacturing process. It will be appreciated that a coupler join may be referenced interchangeably herein as a coupler joint or coupler molding or simply a coupler or coupling or connector or join or joint or butt joint or butt end joint or link or the like without intent to limit. The coupler is formed in accordance with various principles of the present disclosure by molding (e.g., injection molding) a material (e.g., liquid silicone rubber) between spaced apart ends of tubing segments. The tubing segments may be pre-formed and inserted in a generally finished configuration into a mold in which the coupler is to be formed between the tubing segments and to join the tubing segments together. The term "pre-formed", as used herein in connection with the tubing segments, is intended to refer to already-formed (e.g., previously formed, off-the-shelf, pre-existing, premade, already-molded, already-extruded, etc.) tubing, such as with the shape thereof already fixed, set, determined, etc., prior to forming of a coupler between two such pre-formed tubing segments. As such, pre-formed tubing segments generally have been formed to the desired size, shape, configuration, and/or dimensions prior to insertion into the mold in which the coupler is to be formed. The tubing segments may be unreinforced tubing segments (e.g., not braided or otherwise reinforced), or may include reinforced (e.g., braided) tubing segments. The tubing segments may be flexible/compressible tubing segments, such as formed of silicone and the like, which may be used for pharmaceutical, biologic, biopharmaceutical, food, beverage, etc., processes. The coupler may be formed in a variety of different generally tubular configurations to couple together pre-formed tubing segments into a desired configuration of a tubing assembly. The coupler formed in accordance with various principles of the present disclosure may be flexible/compressible to substantially the same extent as the tubing segments which the coupler joins together. As such, closing of the passageways through the tubing assembly is not limited to closing along only the tubing segments, but also includes closing along the couplers as well. The material from which the tubing assembly (the tubing segments as well as the coupler joining the tubing segments) is formed may be sterilizable (such as by gamma irradiation) and generally otherwise suitable for sterile processes. The tubing assembly may be intended for single use and thus considered disposable.

A coupler molding formed in accordance with various principles of the present disclosure has a generally reduced profile compared to prior elements used to join tubing segments. As such, the finished tubing assembly may have a generally reduced outer profile (e.g., diameter) compared to prior assemblies of connected tubing segments, and any further components (e.g., jackets, exoskeletons, etc.) or assemblies (e.g., valve assemblies) may have a generally reduced profile to accommodate the tubing assembly. Less material is used to form such components, in contrast with prior components. Accompanying reductions in manufacturing time (e.g., production cycle time) may therefore be achieved as well. Additionally, the tubing assemblies and associated components take up less space.

The reduced length of a coupler join formed in accordance with various principles of the present disclosure allows closure of the joined tubing segments, such as by a pinch valve, with fewer limitations imposed by prior art joined areas of tubing segments, and with less interference than caused by the generally longer prior art elements joining tubing segments together. In some embodiments, the coupler join may be sufficiently flexible to even permit pinching along the coupler join (in contrast with only along the sides of but not on the coupler join) by a pinch valve. Various reductions in (and even eliminations of) hold up volumes in tubing systems may be achieved by various aspects of coupler joins formed in accordance with various principles of the present disclosure.

A coupler molding formed in accordance with various principles of the present disclosure generally may also allow for a finished tubing assembly with a uniform inner profile. As such, the tubing assembly permits unobstructed and generally smooth flow of fluids therethrough.

In accordance with an aspect of the present disclosure, a coupler join is formed within a mold accommodating the ends of the tubing segments to be joined together. In some embodiments, the mold is formed to allow for sufficient coupler material (e.g., liquid silicone rubber) to be injected between the tubing segments to cool and bond the tubing segments together. In some embodiments, the mold is formed with sufficient space to allow for injection of sufficient material to shrink upon cooling to match the dimensions of the tubing segments to be joined by such material upon cooling. For instance, the depth of the mold recess into which the material forming the coupler join may be deeper than the recess into which the preformed tubing segments are positioned (for being joined together), so that, upon cooling, the dimensions of the coupler formed in such mold generally match the dimensions of the tubing segments joined by the molded coupler. As may be appreciated by those of ordinary skill in the art such dimensions may be determined based on the properties of the material used to form the coupler and/or various operating conditions, the details of which do not impact the scope of the present disclosure. In some embodiments, the ends of the tubing segments to be coupled are spaced apart a sufficient distance to allow sufficient material to be injected therebetween to bond the tubing segments upon cooling.

The present disclosure describes the surprising discovery that molding of a coupler between pre-formed tubing segments in a manner as described herein results in a strong bond between the pre-formed tubing segments at least as strong as bonds formed by prior overmolded coupler joins, but with a number of improvements over prior coupler joins. In accordance with various principles of the present disclosure, to ensure the desired bonding strength, the surfaces of the pre-formed tubing segments should be completely free from contaminants, oils, films, particles, etc. Additionally, the tubing segments being bonded and the bonding material used to form the coupler optimally are selected from the same base material, such as liquid silicone rubber.

Various embodiments of coupler joins, and associated systems and methods of forming such coupler joins and systems, will now be described with reference to examples illustrated in the accompanying drawings. Reference in this specification to "one embodiment," "an embodiment," "some embodiments", "other embodiments", etc. indicates that one or more particular features, structures, and/or characteristics in accordance with principles of the present disclosure may be included in connection with the embodiment. However, such references do not necessarily mean that all embodiments include the particular features, structures, and/or characteristics, or that an embodiment includes all features, structures, and/or characteristics. Some embodiments may include one or more such features, structures, and/or characteristics, in various combinations thereof. Moreover, references to "one embodiment," "an embodiment," "some embodiments", "other embodiments", etc. in various places in the specification are not necessarily all referring to the same embodiment, nor are separate or alternative embodiments necessarily mutually exclusive of other embodiments. When particular features, structures, and/or characteristics are described in connection with one embodiment, it should be understood that such features, structures, and/or characteristics may also be used in connection with other embodiments whether or not explicitly described, unless clearly stated to the contrary. It should further be understood that such features, structures, and/or characteristics may be used or present singly or in various combinations with one another to create alternative embodiments which are considered part of the present disclosure, as it would be too cumbersome to describe all of the numerous possible combinations and subcombinations of features, structures, and/or characteristics. Moreover, various features, structures, and/or characteristics are described which may be exhibited by some embodiments and not by others. Similarly, various features, structures, and/or characteristics or requirements are described which may be features, structures, and/or characteristics or requirements for some embodiments but may not be features, structures, and/or characteristics or requirements for other embodiments. Therefore, the present disclosure is not limited to only the embodiments specifically described herein, and the examples of embodiments disclosed herein are not intended as limiting the broader aspects of the present disclosure.

It will be appreciated that common features in the drawings are identified by common reference elements and, for the sake of brevity and convenience, and without intent to limit, the descriptions of the common features are generally not repeated. For purposes of clarity, not all components having the same reference number are numbered. Moreover, a group of similar elements may be indicated by a number and letter, and reference may be made generally to one or such elements or such elements as a group by the number alone (without including the letters associated with each similar element). It will be appreciated that, in the following description, elements or components similar among the various illustrated embodiments with reference numbers are generally designated with the same reference numbers increased by a multiple of 1000, and redundant description is generally omitted for the sake of brevity. Moreover, certain features in one embodiment may be used across different embodiments and are not necessarily individually labeled when appearing in different embodiments.

Turning now to the drawings, an example of a tubing assembly 100 formed in accordance with various principles of the present disclosure is illustrated in FIG. 1. The tubing assembly 100 has a coupler 110 formed in accordance with various principles of the present disclosure, as described herein, to couple together a first tubing segment 120$a$ and a second tubing segment 120$b$. The first tubing segment 120$a$ and the second tubing segment 120$b$ may be flexible tubing segments, such as silicone rubber tubing, pre-formed with internal passages defined therein for fluid flow therethrough. However, relatively inflexible tubing segments may be used instead or as well.

Figure 2:
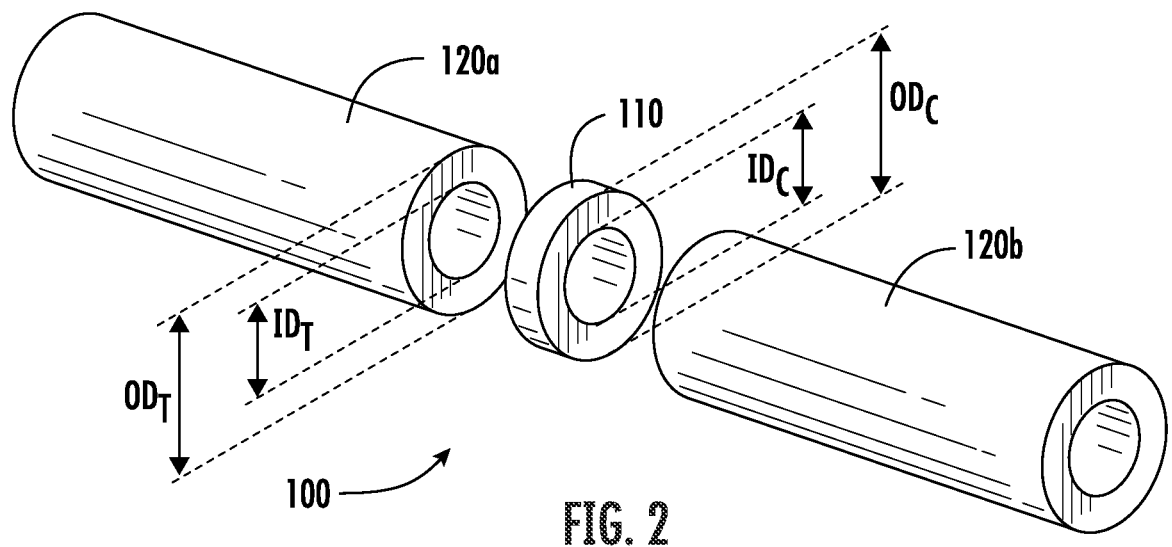
FIG. 2 illustrates an exploded view of the components of joined tubing segments such as illustrated in FIG. 1.

As may be appreciated with reference to FIG. 1 and FIG. 2, the coupler 110 is sized, shaped, configured, and/or dimensioned to couple tubing segments, such as first tubing segment 120$a$ and second tubing segment 120$b$, in an end-to-end junction. The coupler 110 may be formed such that its dimensions correspond with the dimensions of the tubing segments 120$a$, 120$b$ to result in a generally streamlined tubing assembly 100. For example, the coupler 110 may be formed to have an outer diameter $OD_C$ substantially equal to the outer diameter $OD_T$ of the tubing segments 120$a$, 120$b$. Additionally or alternatively, the coupler 110 may be formed to have an inner diameter $ID_C$ substantially equal to the inner diameter $ID_T$ of the tubing segment 120$a$, 120$b$. Moreover, the coupler 110 may be flexible/compressible (e.g., may have a Shore A hardness of approximately 60), and therefore may be closed by a valve (e.g., a pinch valve), so that closing of the passageways through the tubing assembly 100 is not limited to closing along only the tubing segments 120a, 120b, but also includes along the coupler 110 as well. For instance, the reduced outer diameter of the coupler 110 (relative to prior art couplers), such as to be substantially the same as the outer diameter of the tubing segments 120a, 120b, may allow for greater flexibility than previously achievable by prior art couplers extending over the outer surfaces of the tubing segments such prior art couplers joined together.

In accordance with various principles of the present disclosure, a coupler 110 such as illustrated in FIG. 1 and FIG. 2 may be formed between pre-formed tubing segments. More particularly, the coupler 110 may be in an unformed state (e.g., fluid state) and shaped with respect to pre-formed tubing segments such as to allow the coupler 110 to be formed to match the dimensions of the tubing segments. In some embodiments, the coupler 110 may be formed by molding (e.g., injection molding) the coupler 110 between tubing segments to be coupled together. The molding conditions may be selected or set and/or the mold may be formed in accordance with various principles of the present disclosure to achieve the desired finished configuration of a coupler 110 with respect to the tubing segments to be joined by the coupler 110.

Figure 3:
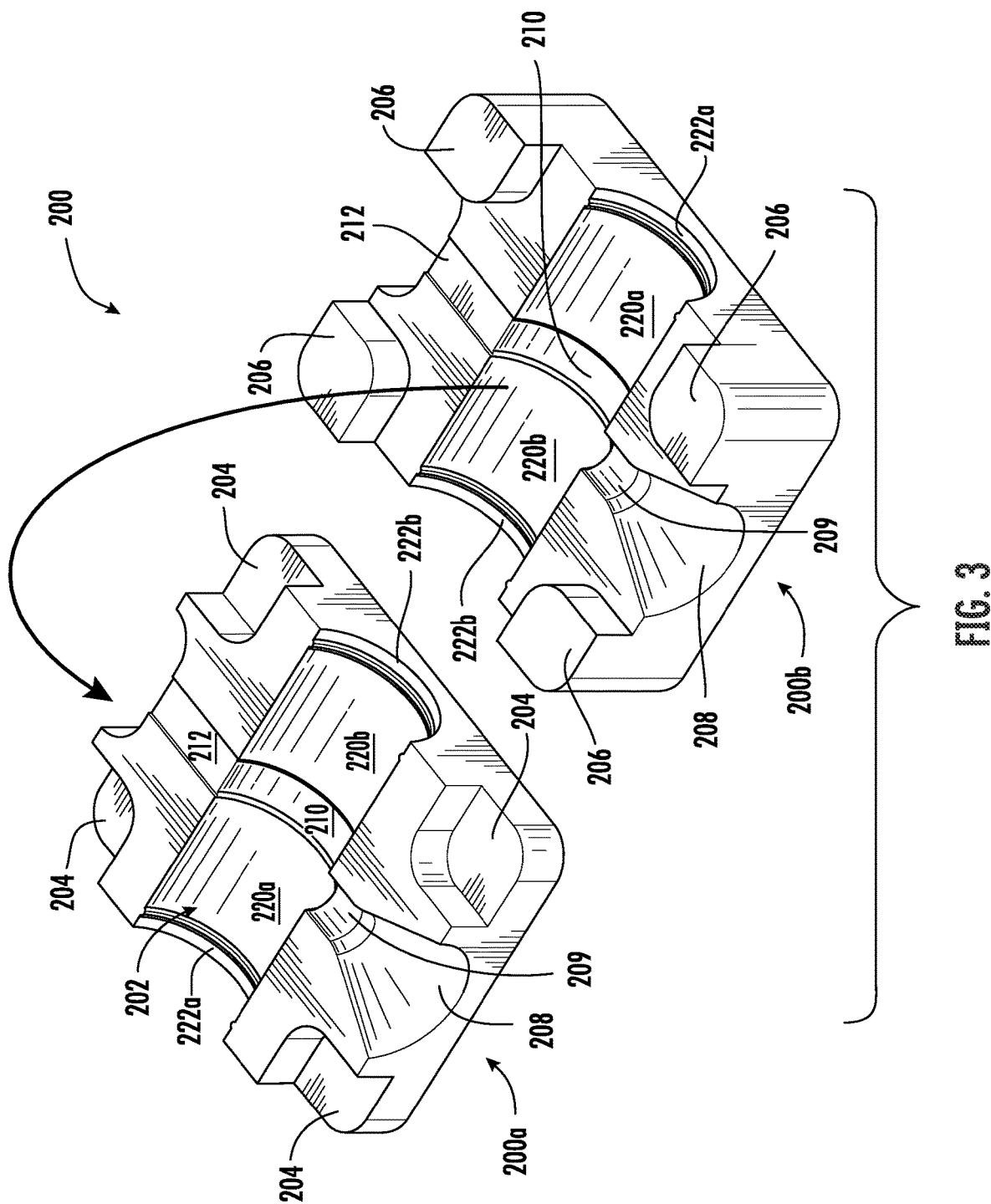
FIG. 3 illustrates a perspective view of a mold (in an open configuration) which may be used to form joined tubing segments such as illustrated in FIG. 1, the other half being essentially a mirror image thereof.

An example of a mold 200 which may be used to form a coupler 110 in accordance with various principles of the present disclosure is illustrated in FIG. 3. The mold 200 may be formed of mating mold halves 200a, 200b, each defining a molding cavity 202 sized, shaped, configured, and/or dimensioned with molding regions 210, 220a, 220b corresponding to the components to be joined to form a tubing assembly 100 in accordance with various principles of the present disclosure. The mold halves 200a, 200b may include alignment elements 204, 206 configured to align the mold halves 200a, 200b with respect to each other. For instance, in the example of an embodiment illustrated in FIG. 3, a female alignment element 204 may be provided on one mold half 200a, and a male alignment element 206 may be provided on the other mold half 200b, the alignment elements 204, 206 being sized, shaped, configured, and/or dimensioned to mate with each other to hold the mold halves 200a, 200b with respect to each other so that the molding regions 210, 220a, 220b are properly aligned to form the coupler 110 within the coupler region 210 of the mold 200 and with respect to tubing segments within the tubing regions 220a, 220b of the mold 200, as may be appreciated by one of ordinary skill in the art.

The coupler region 210 within the molding cavity 202 is specifically sized, shaped, configured, and/or dimensioned for forming a coupler 110 within the mold 200 in accordance with various principles of the present disclosure with respect to the tubing regions 220a, 220b. The tubing regions 220a, 220b are configured for placement of tubing segments 120a, 120b with respect to the coupler region 210 so that the coupler 110 can be formed with respect to the tubing segments 120a, 120b to form a tubing assembly 100 in accordance with various principles of the present disclosure. More particularly, in the illustrated example of an embodiment, the tubing regions 220a, 220b are separated by the coupler region 210 so that a coupler 110 may be formed in accordance with various principles of the present disclosure between tubing segments 120a, 120b positioned in an end-to-end configuration (e.g., in general axial alignment) with respect to each other. In the example of an embodiment of a finished tubing assembly 100, such as illustrated in FIG. 1 and FIG. 2, the tubing segments 120a, 120b abut opposite faces of the finished coupler 110. To form a coupler 110 between the tubing segments 120a, 120b, the tubing segments 120a, 120b must be spaced apart from each other at least enough to allow the material of the coupler 110 to flow therebetween, such as at least about 0.1" (2.54 mm) apart, within the mold 200. For instance, the tubing segments 120a, 120b may be spaced apart from each other about 0.2" (5.08 mm) to allow sufficient material to flow therebetween to form a coupler 110. Further spacing as well as mold shapes are within the scope of the present disclosure, such as to form differently shaped molded sections between pre-formed tubing segments, as described in further detail below. Moreover, in accordance with various principles of the present disclosure, the sizes, shapes, configurations, and/or dimensions of the tubing regions 220a, 220b are selected to correspond with the tubing segments 120a, 120b to be placed therein and to be coupled together by a coupler 110 formed within the mold 200. For instance, the diameters of the tubing regions 220a, 220b may closely match the outer diameters of the tubing segments 120a, 120b to be placed within the mold 220 (either the outer diameters $OD_T$ of the tubing segment 120a, 120b in a resting or neutral configuration, such as when in normal use, or when in a somewhat stretched configuration for molding purposes, as described in further detail below) to be coupled together with the coupler 110. Such matching generally prevents the coupler 110 from being formed (e.g., overmolded over) the exterior of the tubing segments 120a, 120b to allow a tubing assembly 100 with a substantially uniform outer configuration (e.g., overall outer diameter) to be formed.

In some embodiments, a tube pinch ridge 222a, 222b may be formed along a respective tubing region 220a, 220b within the mold 200, as illustrated in FIG. 3. The tube pinch ridges 222a, 222b are sized, shaped, configured, dimensioned, and/or positioned to hold a tubing segment 120a, 120b in place within tubing regions 220a, 220b, and thus in place with respect to the coupler region 210, such as to control (e.g., stabilize) the position of the tubing segments 210a, 210b with respect to the coupler 110, such as during formation of the coupler 110. The pinch ridges 222a, 222b may be spaced away from the ends of the tubing segments 120a, 120b (and the coupler region 210) so as to minimize any effect pinching of the tubing segments 120a, 120b by the pinch ridges 222a, 222b may have at the joint between the tubing segments 120a, 120b and the coupler 110.

Figure 4A:
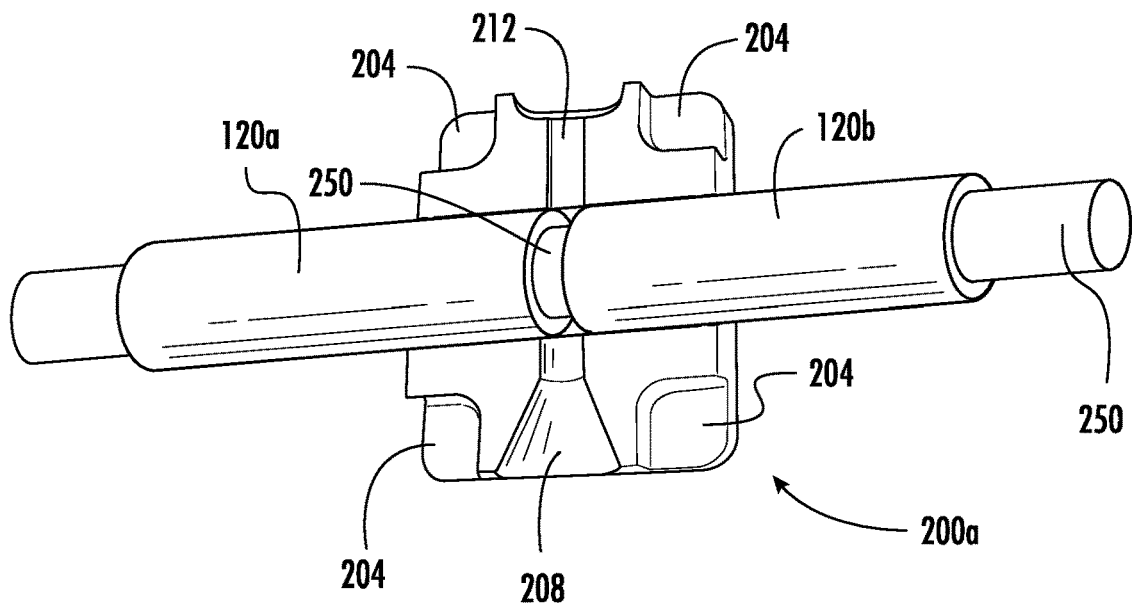
Figure 4B:
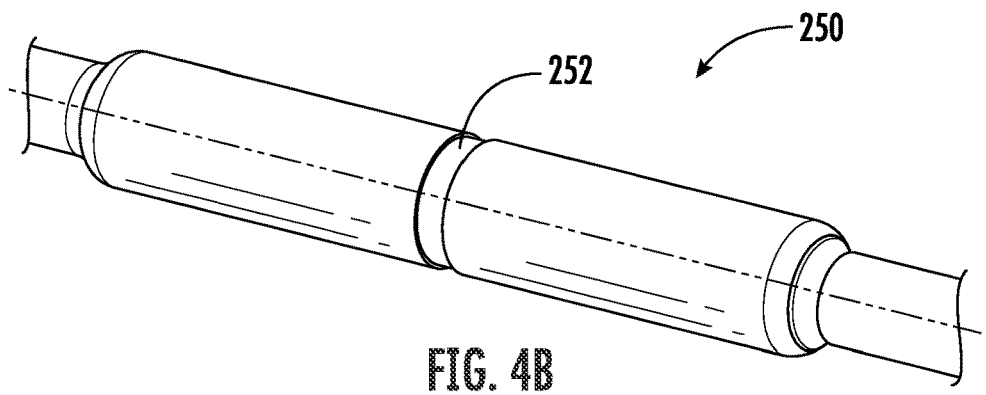
FIG. 4B illustrates a perspective view of an embodiment of the mandrel shown in FIG. 4A.

In some embodiments, as illustrated in FIG. 4A, a mandrel 250 may be inserted through the tubing segments 120a, 120b to hold the tubing segments 120a, 120b in place, and/or to maintain a uniform shape of the tubing segments 120a, 120b as the coupler 110 is formed with respect thereto. In some embodiments, the tubing segments 120a, 120b may be stretched to have an inner diameter larger than a resting-state inner diameter to fit over the mandrel 250 (the outer diameter of the mandrel 250 may be larger than the inner diameter of the tubing segments 120a, 120b). It will be appreciated that the resulting outer diameters of the tubing segments 120a, 120b may also be somewhat larger when the tubing segments 120a, 120b are extended over the mandrel 250 when in the mold 200 to form a coupler 110 therebetween. It is noted that the mandrel 250 may extend across the coupler region 210 so that the material forming the coupler 110 flows over and around the mandrel 250 to form an inner passage within the coupler 110. Moreover, the mandrel 250 may inhibit or prevent the flow of the flowable material from which the coupler 110 is formed into the inner passages within the tubing segments 120a, 120b. Additionally or alternatively, the mandrel 250 may assist with assuring a substantially uniform inner passageway within the tubing assembly 100 formed in the mold 200 with the mandrel 250 extended through the tubing segments 120a, 120b and with the coupler 110 formed over the portion of the mandrel 250 extending between but not within the tubing segments 120a, 120b. For instance, the mandrel 250 may be configured and positioned to assure that the inner diameter of the side of the coupler 110 abutted by and bonded with the end (e.g., cut face) of the first tubing segment 120a is substantially equal to the inner diameter of the first tubing segment 120a, and the inner diameter of the side of the coupler 110 abutted by and bonded with the end (e.g., cut face) of the second tubing segment 120b is substantially equal to the inner diameter of the second tubing segment 120b. In the example of an embodiment illustrated in FIG. 1 and FIG. 2 which may be formed with the mold 200 and mandrel 250 illustrated in FIG. 3 and FIG. 4, the coupler 110 may be formed to have an inner diameter $ID_C$ substantially equal to the inner diameter $IDT$ of the tubing segment 120a, 120b.

The manner in which the coupler 110 is formed with respect to the tubing segments 120a, 120b results in a mechanical and/or chemical bond between the materials of the tubing segments 120a, 120b and the coupler 110 to result in a strong bond capable of withstanding various forces (e.g., compression, expansion, and axial forces) which may be applied or otherwise exerted against the finished tubing assembly 100. In accordance with one aspect of the present disclosure, the coupler 110 may be formed by injection molding the material from which the coupler 110 is formed into the mold 200 while the mold halves 200a, 200b are held together around the tubing segments 120a, 120b within the tubing regions 220a, 220b. In one aspect, the injection molded material may be in a flowable form which is injected into the mold 200, in which pre-formed tubing segments 120a, 120b are positioned. The material from which the coupler 110 is formed may be flowable either in a heated state or at generally ambient temperature. Liquid silicone rubber, such as, in particular, a medical grade liquid silicone rubber, and even more particularly, a liquid silicone rubber (such as a medical grade liquid silicone rubber) with a 60 Shore A Durometer may advantageously be used, although the present disclosure need not be so limited. For the sake of convenience, and without intent to limit, reference may be made herein to liquid silicone rubber as the material from which a coupler may be formed in accordance with various principles of the present disclosure, although other materials may be used, the present disclosure not being limited by the particular material used to form a coupler with various of the properties and/or features disclosed herein. The mold halves 200a, 200b illustrated in FIG. 3 (and the mold half 200a illustrated in FIG. 3) include a nozzle seating 208 configured to securely hold an injection nozzle (not shown, but which may be any nozzle known to those of ordinary skill in the art for injecting materials into a mold) to inject material through an injection port 209 and into the coupler region 210 to form a coupler between tubing segments within the tubing regions 220a, 220b. A flash vent 212 may be provided, as illustrated in FIG. 3, to allow excess material or flash to exit the mold 200. The material from which the coupler 110 is formed is then allowed to solidify and cool.

The mixing machine for the material from which the coupler 110 is to be formed may be set to about 800-1000 psi (such as depending on various operating conditions and/or properties of the material being molded). The mold 200, and optionally also the mandrel 250 and a press or platen (not shown, but which may be any press or platen known to those of ordinary skill in the art for use in an injection molding process) holding the mold halves 200a, 200b together, are heated to cure the material. In some embodiments, a heat press is set to approximately 135-200° C. (approximately 275°-392° F. or 408.2-473.5 K) and the mold 200 and mandrel 250 are thereby heated (e.g., by heat conduction from the heat press). In some embodiments, the mold 200 and mandrel 250 are allowed to heat soak for approximately 15 minutes. The material is injected into the mold 200 at ambient temperature, and cured within the heated environment within the mold 200. The material is injected until flash is present/becomes evident in the flash vent 212, indicating sufficient material has been injected into the mold 200 to form the coupler 110. The material is allowed to cure, such as for about 2-3 minutes, before being removed from the mold 200. If necessary or desired, the tubing assembly may be cooled for an additional amount of time outside the mold 200. The flash may be removed in a manner such as known in the art.

Because materials such as liquid silicone rubber may shrink as they cool after a curing process, the coupler region 210 of the mold 200 may be deeper than the tubing regions 220a, 220b such that the initial thickness of the material which flows into the coupler region 210 is greater than the thickness of the pre-formed tubing segments 120a, 120b. As the material forming the coupler 110 shrinks, at least the final outer configuration of the coupler 110 will be substantially the same as the outer configurations of the tubing segments 120a, 120b coupled together by the coupler 110. The depth of the coupler region 210 is determined based on the shrinkage of the material from which the coupler 110 is formed. As the material of the coupler 110 shrinks, the final outer diameter of the coupler 110 is preferably substantially equal to the outer diameter of the tubing segments 120a, 120b abutting the sides of the coupler 110. More particularly, the outer diameter of the side of the coupler 110 abutted by and bonded with the end (e.g., cut face) of the first tubing segment 120a is preferably equal to the outer diameter of the first tubing segment 120a, and the outer diameter of the side of the coupler 110 abutted by and bonded with the end (e.g., cut face) of the second tubing segment 120b is preferably equal to the outer diameter of the first tubing segment 120b. Similarly, the inner diameter of the side of the coupler 110 abutted by and bonded with the end (e.g., cut face) of the first tubing segment 120a is preferably equal to the inner diameter of the first tubing segment 120a, and the inner diameter of the side of the coupler 110 abutted by and bonded with the end (e.g., cut face) of the second tubing segment 120b is preferably equal to the inner diameter of the first tubing segment 120b. In some embodiments the mandrel 250 may have a circumferential notch 252 that aligns with the coupler region 210 of the mold 200 when the mandrel and the tubing segments 120a, 120b are inserted in the mold. The depth of the circumferential notch 252 is determined based on the shrinkage of the material from which the coupler 110 is formed. Thus arranged, as the material of the coupler 110 shrinks, the final inner diameter of the coupler 110 is preferably substantially equal to the inner diameter of the tubing segments 120a, 120b abutting the sides of the coupler 110.

Figure 5:
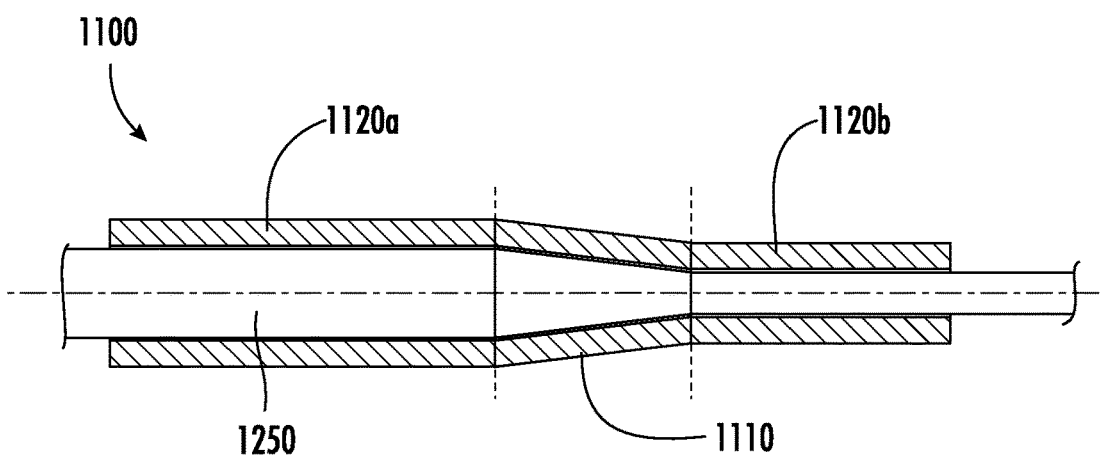
FIG. 5 illustrates a cross-sectional view of an alternate embodiment of two separately formed tubing segments joined in accordance with various principles of the present disclosure.

In the example of an embodiment of a tubing assembly 100 illustrated in FIG. 1 and FIG. 2, which may be formed with a mold 200 as illustrated in FIG. 3, the outer diameters of the first tubing segment 120a, coupler 110, and second tubing segment 120b are substantially the same, and the inner diameters of the first tubing segment 120a, coupler 110, and second tubing segment 120b are substantially the same. However, other configurations are within the scope and spirit of the present disclosure. For instance, in the example of an embodiment of a tubing assembly 1100 illustrated in FIG. 5, a first tubing segment 1120a abutting and bonded to a first side of a coupler 1110 has a larger outer diameter and a larger inner diameter than the respective outer diameter and inner diameter of the second tubing segment 1120b abutting and bonded to the opposite side of the coupler 1110. In such embodiment, a mandrel 1250 with a tapered portion, between a section with an outer diameter equal to or larger than the inner diameter of the first tubing segment 1120a and which is inserted into the first tubing segment 1120a, and a section with an outer diameter equal to or larger than the inner diameter of the second tubing segment 1120b and which is inserted into the second tubing segment 1120b, may be used. Other properties of the tubing assembly 1100 may be substantially the same as properties of the above-described tubing assembly 100 and are not repeated for the sake of brevity.

It will be appreciated that principles of the present disclosure are not limited to linear end-to-end connections of tubing segments or even to linear tubing segments such as those illustrated in FIG. 1 and FIG. 2. Various tubing segments may be joined in accordance with various principles of the present disclosure in various linear or nonlinear configurations using couplers such as described above. Various examples of other configurations of tubing assemblies formed in accordance with various principles of the present disclosure are illustrated in FIG. 6, FIG. 7, FIG. 8, FIG. 9, FIG. 10, and FIG. 11. As may be appreciated, molded (e.g., injection molded) nonlinear tubing segments (alternately referenced herein as tubular fittings without intent to limit), such as branched (e.g., T-shaped or cross-shaped) molded tubular fittings, may be used to join various tubing segments (e.g., flexible elongated tubing segments and/or branched tubing segments) into various configurations. The tubing segments may be joined in substantially linear, curved, T-shaped, Y-shaped, cross-shaped, branched, looped, or other arrangements, including combinations thereof (e.g., a curved tubing segment coupled with a substantially straight tubing segment, linear segments transverse or perpendicular to one another, etc.), the particular shape not limiting or being limited by the present disclosure. It will further be appreciated that the configuration of a coupler formed in accordance with various principles of the present disclosure need not be limited to the configuration described above, and may be branched or otherwise configured to form a nonlinear connection between two or more tubing segments or tubular fittings.

Figure 6:
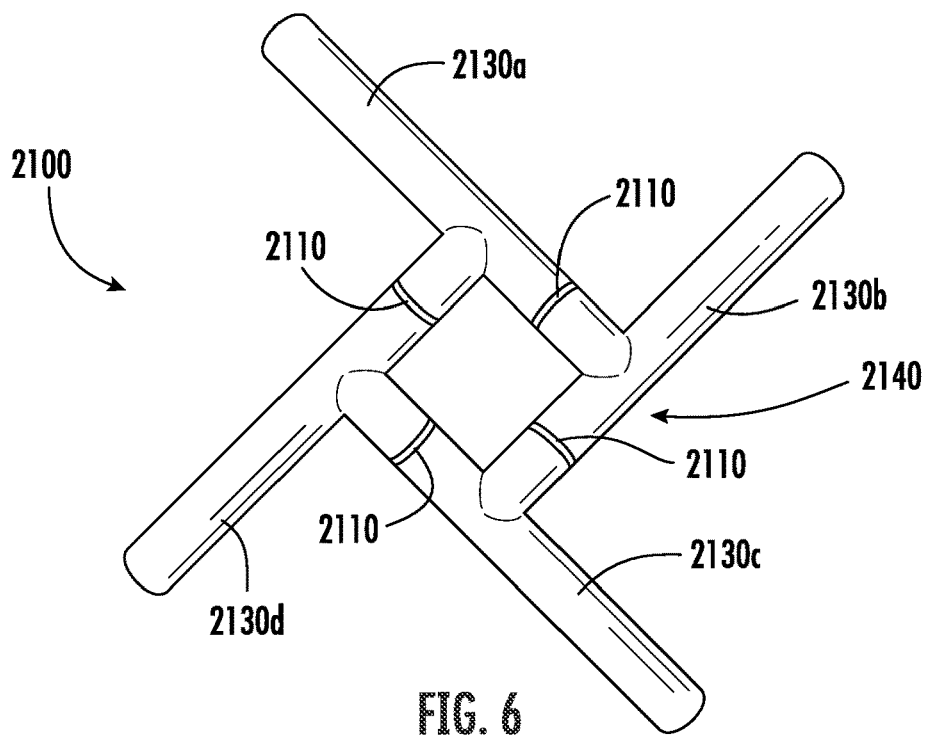
FIG. 6 illustrates a plan view of another configuration of tubing segments joined in accordance with various principles of the present disclosure.

An example of a looped embodiment of a tubing assembly 2100 is illustrated in FIG. 6, with a plurality of molded (e.g., injection molded) T-shaped tubular fittings 2130a, 2130b, 2130c, 2130d coupled together using couplers 2110 similar to the above-described coupler 110 and optionally coupled and formed in a manner such as described above. In the illustrated example, four T-shaped tubular fittings 2130a, 2130b, 2130c, 2130d are coupled together, although coupling of other than four tubular fittings (T-shaped or otherwise) is within the scope of the present disclosure. The resulting multi-path tubing assembly 2100 has a generally square loop with a plurality of branches, such as at the corners of the loop. Abutting ends of the tubular fittings 2130a, 2130b, 2130c, 2130d are joined in accordance with various principles of the present disclosure without the need for an overmolded extending over the exteriors of the abutting tubing segments thereby forming a looped flow path 2140 that is smaller than prior art looped flow paths using larger, overmolded. Because the lengths of the couplers 2110 are minimized (relative to prior art couplers) by the various principles of the present disclosure, any section of the looped flow path 2140 may be closed by a valve with a minimally-sized (if any) resultant dead-leg. Moreover, the couplers 2110 may be flexible/compressible (e.g., may have a Shore A hardness of approximately 60), and therefore may be closed by a valve (e.g., a pinch valve), so that closing of the passageways through the tubing assembly 2100 is not limited to closing along only the tubular fittings 2130a, 2130b, 2130c, 2130d, but also includes along the couplers 2110 as well. For instance, the reduced outer diameter of the coupler 2110 (relative to prior art couplers), such as to be substantially the same as the outer diameter of the tubing segments 2320a, 2130b, 2130c, 2130d, may allow for greater flexibility than previously achievable by prior art couplers extending over the outer surfaces of the tubing segments such prior art couplers joined together.

Figure 7:
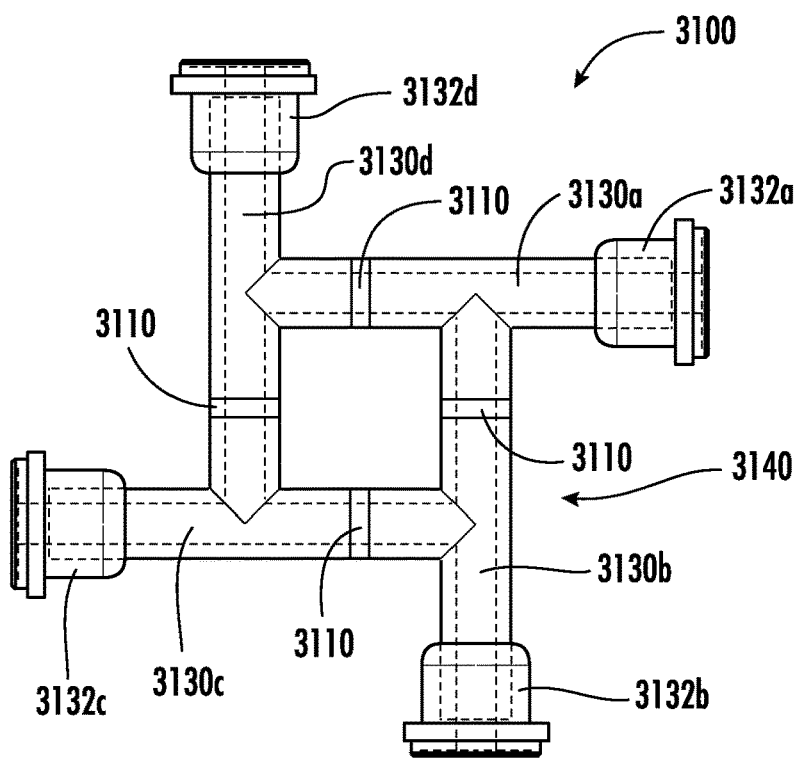
FIG. 7 illustrates a plan view of another configuration of tubing segments joined in accordance with various principles of the present disclosure.

The example of an embodiment of a tubing assembly 3100 illustrated in FIG. 7 is similar to the example of an embodiment of a tubing assembly 2100 illustrated in FIG. 6, with T-shaped tubular fittings 3130a, 3130b, 3130c, 3130d coupled with couplers 3110 similar to the above-described coupler 110, and optionally coupled and formed in a manner such as described above, to form a looped flow path 3140 along one section thereof. In contrast with the tubing assembly 2100 illustrated in FIG. 6, the tubing assembly 3100 illustrated in FIG. 7 includes flanges 3132a, 3132b, 3132c, 3132d (e.g., tri-clamp or TC ends) at the free ends of the branches thereof (extending from the looped flow path 3140 unconnected to other tubing segments in the tubing assembly 3100) configured for coupling to other tubing segments or other components in a manner known in the art. Other characteristics of the tubing assembly 3100 may be similar to those described above with respect to the tubing assembly 2100 illustrated in FIG. 6 and thus, for the sake of brevity, are not repeated.

Figure 8:
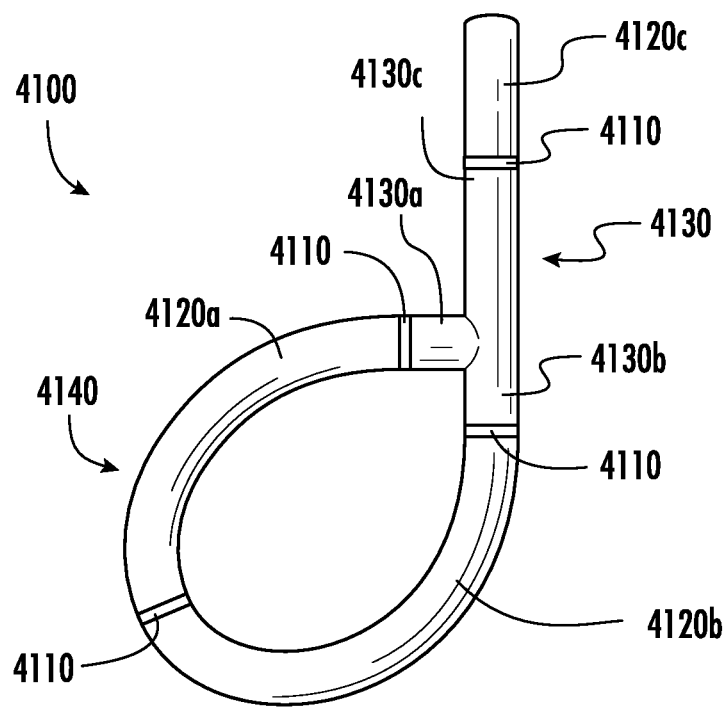
FIG. 8 illustrates a plan view of another configuration of tubing segments joined in accordance with various principles of the present disclosure.
Figure 9:
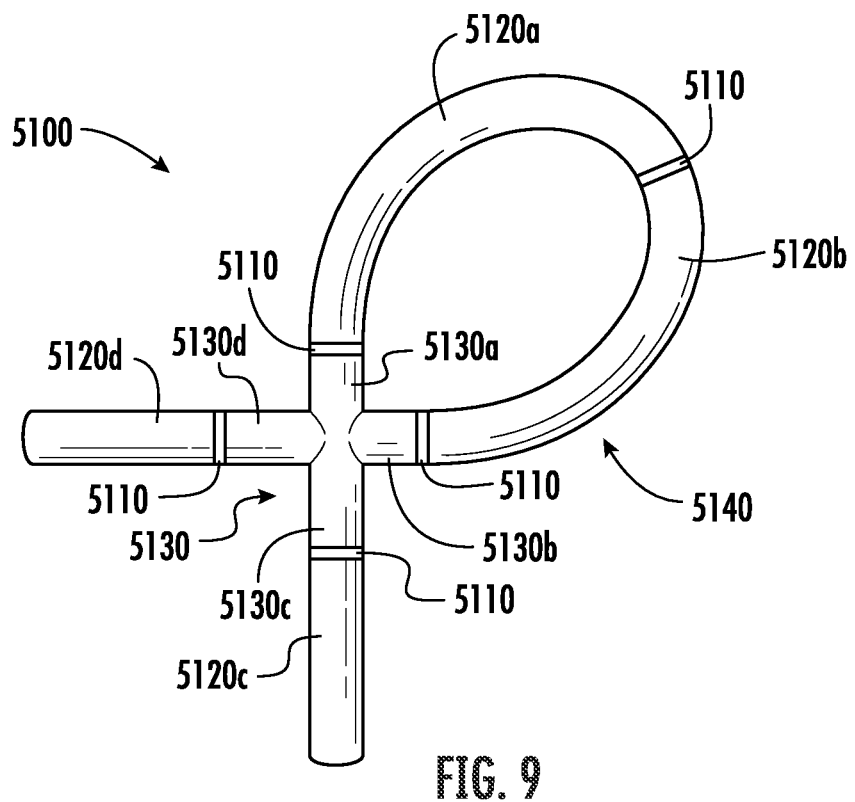
FIG. 9 illustrates a plan view of another configuration of tubing segments joined in accordance with various principles of the present disclosure.

Examples of configurations of tubing assembles 4100 and 5100 forming curved loops with generally curved tubing segments and molded branched tubular fittings coupled together with couplers formed in accordance with various principles of the present disclosure are illustrated in FIG. 8 and FIG. 9, respectively. In the example of an embodiment of a tubing assembly 4100 illustrated in FIG. 8, a combination of linear (e.g., flexible linear tubular segments flexed into a curved configuration) or curvilinear (e.g., molded into a curved configuration) tubing segments 4120a, 4120b, 4120c and at least one T-shaped tubing segment 4130a are coupled together using one or more couplers 4110 similar to the above-described coupler 110, and optionally coupled and formed in a manner such as described above, to form a looped flow path 4140 (e.g., a curved loop) with at least one branch extending therefrom (e.g., tubing segment 4120c). In this example, one or more tubing segments 4120a, 4120b may be flexible and flexed into a curved configuration, or may be substantially set (such as molded) into a curved configuration, or otherwise are joined to form a generally curved looped flow path 4140. The free ends of the tubing segments 4120a, 4120b forming the looped flow path 4140 are coupled to ends of a T-shaped tubing segment 4130 via couplers 4110 similar to the above-described coupler 110, and optionally coupled and formed in a manner such as described above. It will be appreciated that the looped flow path 4140 may instead be formed from a single tubing segment with a first end coupled to one branch 4130a of the T-shaped tubing segment 4130 and a second end coupled to another branch 4130b of the T-shaped tubing segment 4130. An additional coupler 4110 may be used to couple an additional tubing segment 4120c to the remaining branch 4130c of the T-shaped tubing segment 4130 to form a branch or flow path extending from the looped flow path 4140. It will be appreciated that tubing segments 4120a, 4120b, 4120c may instead all extend linearly from the T-shaped tubing segment 4130 instead of forming one or more loops coupling branches 4130a, 4130b, 4130c of the T-shaped tubing segment 4130.

Instead of coupling tubing segments with a T-shaped tubing segment, in the example of an embodiment of a tubing assembly 5100 illustrated in FIG. 9, a cross-shaped tubing segment 5130 and tubing segments 5120a, 5120b, 5120c, 5120d are coupled together with one or more couplers 5110 similar to the above-described coupler 110, and optionally coupled and formed in a manner such as described above, to form a looped flow path 5140 (e.g., a curved loop) with optionally one or more branches or flow paths (e.g., 5120c, 5120d) extending therefrom. In this example, one or more tubing segments 5120a, 5120b may be flexible and flexed into a curved configuration, or may be substantially set (such as molded) into a curved configuration, or otherwise are joined to form a generally curved looped flow path 5140. It will be appreciated that the looped flow path 5140 may be formed from a single tubing segment with a first end coupled to one branch 5130a of the cross-shaped tubing segment 5130 and a second end coupled to another branch 5130b of the cross-shaped tubing segment 5130. Additional couplers 5110 may be used to couple additional tubing segments 5120c, 5120d to the other branches 5130c, 5130d of the cross-shaped tubing segment 5130. It will be appreciated that tubing segments 5120a, 5120b, 5120c, 5120d may extend linearly from the branches of the cross-shaped tubing segment 5130 instead of forming loops coupling branches of the cross-shaped tubing segment 5130.

As noted above, tubing assemblies with T-shaped or cross-shaped tubing segments (which may be alternately referenced herein as tubular fittings without intent to limit) may be used to form branched tubing assemblies without loops. Additional examples of embodiments of tubing assemblies 6100, 7100 with other configurations of linear or curvilinear tubing segments and branched tubular fittings joined together using couplers similar to the above-described coupler 110, and optionally coupled and formed in a manner such as described above, are illustrated in FIG. 10 and FIG. 11. In the example of an embodiment of a branched tubing assembly 6100 illustrated in FIG. 10, a branched tubular fitting 6130, such as may be known as a coupler quad or Quad Tee, includes a common flow path 6132 (which may be alternately referenced herein as a mainline), and a plurality of branch flow paths 6134 (which may be alternately referenced herein as drop legs) extending from the common flow path 6132. Couplers 6110 similar to the above-described coupler 110 may be used to couple tubing segments 6120a, 6120b to respective ends 6132a, 6132b of the mainline 6132 of the branched tubular fitting 6130, and to couple branch tubing segments 6120c, 6120d, 6120e, 6120f to respective drop legs 6134a, 6134b, 6134c, 6134d of the branched tubular fitting 6130, optionally coupled and formed in a manner such as described above.

Figure 10:
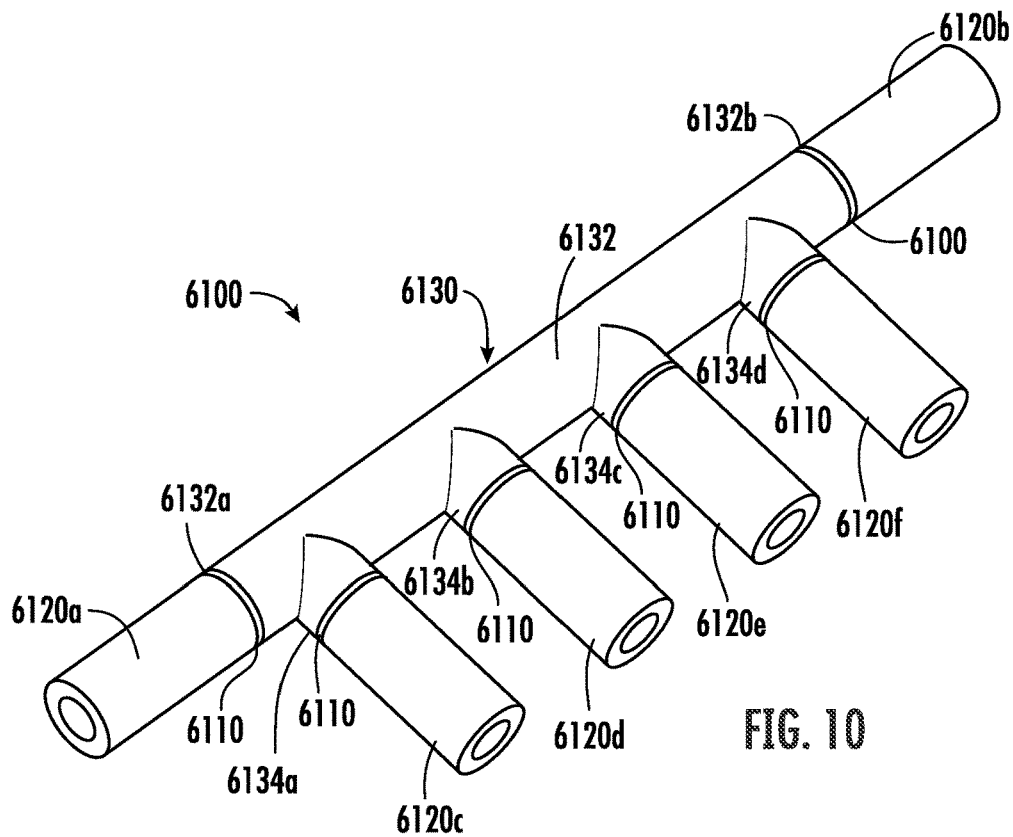
FIG. 10 illustrates a plan view of an another configuration of tubing segments joined in accordance with various principles of the present disclosure.
Figure 11:
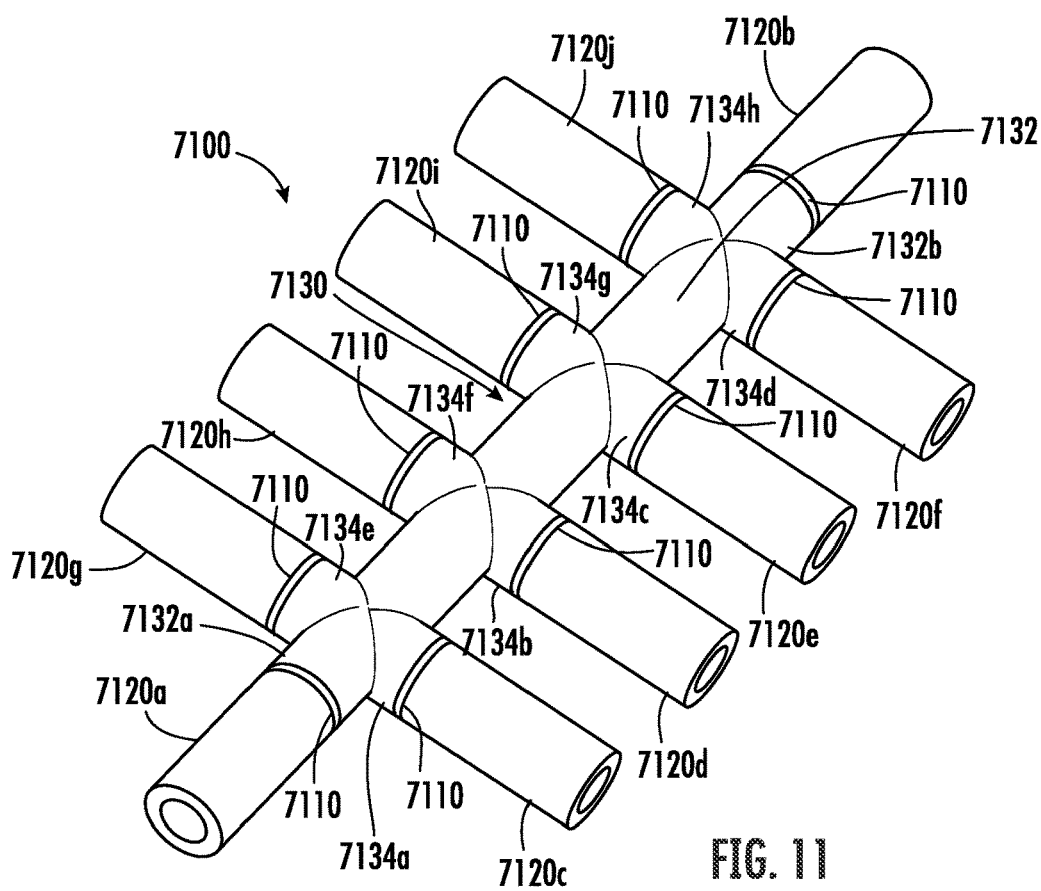
FIG. 11 illustrates a plan view of an another configuration of tubing segments joined in accordance with various principles of the present disclosure.
Figure 12:
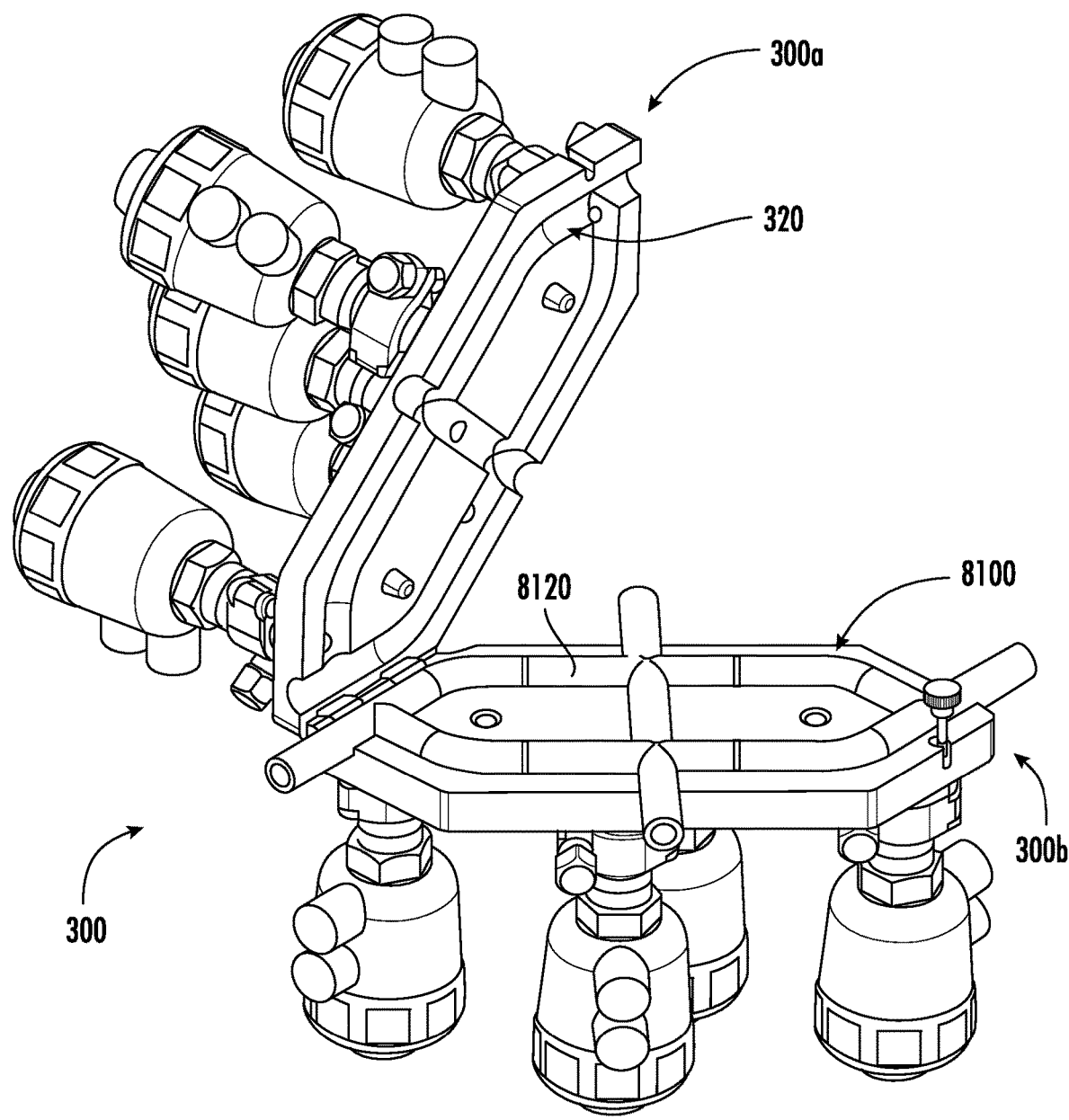
FIG. 12 illustrates a plan view of a valve assembly in which tubing segments joined in accordance with various principles of the present disclosure may be positioned.

It will be appreciated that additional branches than those illustrated in FIG. 10 may extend from a common flow path of a tubular fitting to which tubing segments are coupled in accordance with various principles of the present disclosure. For instance, in the example of an embodiment of a tubing assembly 7100 illustrated in FIG. 11, pairs of branches or drop legs 7134a, 7134b, 7134c, 7134d, 7134e, 7134f, 7134g, 7134h extend in opposite directions from the mainline 7132 of a branched tubing segment/tubular fitting 7130. More particularly, in addition to a plurality of drop legs 7134a, 7134b, 7134c, 7134d extending generally along one side of the branched tubular fitting 7130, an additional plurality of drop legs 7134e, 7134f, 7134g, 7134h extend along another side of the mainline 7132 of the branched tubular fitting 7130, such as opposite the legs 7134a, 7134b, 7134c, 7134d. It will be appreciated that although the legs 7134a, 7134b, 7134c, 7134d, 7134e, 7134f, 7134g, 7134h are illustrated as extending generally linearly along the branched tubular fitting 7130, other configurations are within the scope and spirit of the present disclosure. As will be appreciated, various tubing segments 7120 are coupled to ends of the branched tubular fitting 7130 with couplers 7110 similar to the above-described coupler 110 and optionally coupled and formed in a manner such as described above. It will be appreciated that fewer or more than four branches may extend from a common flow path of a branched tubular fitting with which additional tubing segments are coupled in accordance with various principles of the present disclosure.

Instead of using pre-formed branched tubular fittings and coupling pre-formed tubing segments thereto with couplers similar to the above-described coupler 110, and optionally in a manner as described above, the tubular fittings (e.g., branched tubing segments) may be formed in a manner similar to the manner in which the above-described coupler 110 is formed to be joined to pre-formed tubing segments. More particularly, a tubular fitting may be formed in a mold with tubular segments strategically placed with free ends adjacent the mold cavity in which the tubular fitting is to be formed. After the material from which the tubular fitting is filled into the mold, and upon cooling and curing of the thereby molded tubular fitting, the finished molded tubular fitting is bonded to the free ends of the tubing segments adjacent the mold cavity for the tubular fitting. Thus, instead of inserting pre-formed tubing segments and/or tubular fittings into a mold configured to form a coupler 2110, 3110, 4110, 5110, 6110, 7110 such as illustrated in FIG. 6, FIG. 7, FIG. 8, FIG. 9, FIG. 10, FIG. 11, respectively, the pre-formed tubing segments and/or tubular fittings may be inserted into a mold configured to form a branched tubular fitting (such as, without limitation, T-shaped, cross-shaped, Y-shaped, Quad Cross shaped, Quad Tee shaped, etc.). The resulting configurations appear substantially the same as the tubing assemblies illustrated in FIG. 6, FIG. 7, FIG. 8, FIG. 9, FIG. 10, FIG. 11, except without couplers 2110, 3110, 4110, 5110, 6110, 7110 between the tubing segments 2130, 3130, 4130, 5130, 6130, 7130 and the pre-formed tubing segments 2120, 3120, 4120, 5120, 6120, 7120. It will be appreciated that descriptions herein of couplers are generally applicable to tubular fittings formed as described above with tubing segments substantially directly coupled thereto. Such formation of tubular fittings to be adjoined to pre-formed tubing segments positioned in the mold in which the tubular fittings are formed results in lower profile joints between tubular segments with similar benefits as described above with respect to the couplers 1110, 2110, 3110, 4110, 5110, 6110, 7110. Additionally, it will be appreciated that such formation of tubular fitting further improves manufacturing ease and efficiency by combining the step of molding the tubular fitting with the step of adjoining pre-formed tubing segments to such molded tubular fitting.

It will be appreciated that couplers 4110, 5110, 6110, 7110 formed such as the above-described coupler 110, including the molding of branched tubular fittings to be adjoined to pre-formed tubing segments (upon completion of the molding of the tubular fitting, such as described above), allow the joining of abutting ends of tubing segments 4120, 5120, 6120, 7120 without using overmolded couplers over the exterior of the abutting tubing segments. The resulting flow paths are smaller than similarly shaped prior art flow paths using larger connectors (typically overmolded over the exterior of the abutting tubing segments) to couple together the tubing segments forming such flow path. Because the lengths of the couplers 4110, 5110, 6110, 7110 are minimized (relative to prior art couplers) by the various principles of the present disclosure, or additional couplers are even eliminated, any section of the flow paths 4140, 5140, 6132, 6134, 7132, 7134, or tubing segments 4120, 5120, 6120, 7120 may be closed by a valve with a minimally-sized (if any) resultant dead-leg. Moreover, the couplers 4110, 5110, 6110, 7110 may be flexible/compressible (e.g., may have a Shore A hardness of approximately 60), and therefore may be closed by a valve (e.g., a pinch valve), so that closing of the passageways through the tubing assembly 4100, 5100, 6100, 7100 is not limited to closing along only the tubing segments 4120, 5120, 6120, 7120 but also includes closing along the couplers 4110, 5110, 6110, 7110 as well. For instance, the reduced outer diameter of the coupler 4110, 5110, 6110, 7110 (relative to prior art couplers), such as to be substantially the same as the outer diameter of the tubing segments 4120, 5120, 6120, 7120 may allow for greater flexibility than previously achievable by prior art couplers extending over the outer surfaces of the tubing segments such prior art couplers joined together.

Another benefit of the size reduction achieved by couplers formed in accordance with various principles of the present disclosure is the size reduction of various components such as valve assemblies, jackets, exoskeletons, etc., used in conjunction with a tubing assembly. For instance, an example of an embodiment of a valve assembly 300 in which a tubing assembly 8100 formed in accordance with various principles of the present disclosure may be used. In contrast with prior valve assemblies, the valve body portions 300a, 300b of the valve assembly 300 have mating recessed surfaces 320 (only visible in the valve body portion 300a lifted away from the tubing assembly 8100 which is seated in a corresponding recessed surface formed in the other valve body portion 300b) forming a passageway with relatively uniform diameter branches for securely seating branches of a tubing assembly 8100 formed in accordance with various principles of the present disclosure. Because the couplers 8110 joining the various tubing segments 8120 of the tubing assembly 8100 have a smaller outer diameter than prior connectors between tubing segments, and preferably an outer diameter substantially equal to the outer diameters of the tubing segments 8120 of the tubing assembly 8100, the recessed surfaces may be substantially uniform in diameter. As such, special forming of widened areas to accommodate larger connectors is not required as in previous valve assemblies. A valve assembly 300 may thus be formed more simply (e.g., with fewer steps) than required to form current valve assemblies which must accommodate wider/larger couplers.

As may be appreciated, various principles of the present disclosure, whether taken individually or in various combinations, provide various benefits over prior art tubing assemblies and tubing couplers as described above. The benefits extend to improvements in molds (e.g., reduction of material and overall size of molds such as to correspond with the reduction in size of the joined tubing segments; simplification of mold formation, such as by no longer requiring impressions to be formed to correspond with an overmolded connector such as a "bubble" connector; etc.), molding (e.g., reduction in production time such as a result of reduction of curable mass, etc.), components (e.g., streamlining of exteriors and/or interiors; reduction in material, etc.), production throughput (e.g., increased such as by no longer needing to locate a join along a tubing assembly, etc.), and associated components and assemblies (e.g., such as by no longer needing a larger "bubble" connector ingress in assemblies in which a tubing assembly formed in accordance with various principles of the present disclosure).

In view of the above, it should be understood that the various embodiments illustrated in the figures have several separate and independent features, which each, at least alone, has unique benefits which are desirable for, yet not critical to, the presently disclosed coupler joins, tubing assemblies, and methods and apparatus for forming coupler joins and tubing assemblies. Therefore, the various separate features described herein need not all be present in order to achieve at least some of the desired characteristics and/or benefits described herein. One or more of the features described with reference to one embodiment can be combined with one or more of the features of any of the other embodiments provided herein. That is, any of the features described herein can be mixed and matched to create hybrid designs, and such hybrid designs are within the scope of the present disclosure. Therefore, the present invention is not limited to only the embodiments specifically described herein. The above descriptions are of illustrative examples of embodiments only, and are not intended as limiting the broader aspects of the present disclosure.

The foregoing discussion has broad application and has been presented for purposes of illustration and description and is not intended to limit the disclosure to the form or forms disclosed herein. It will be understood that various additions, modifications, and substitutions may be made to embodiments disclosed herein without departing from the concept, spirit, and scope of the present disclosure. In particular, it will be clear to those skilled in the art that principles of the present disclosure may be embodied in other forms, structures, arrangements, proportions, and with other elements, materials, and components, without departing from the concept, spirit, or scope, or characteristics thereof. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. While the disclosure is presented in terms of embodiments, it should be appreciated that the various separate features of the present subject matter need not all be present in order to achieve at least some of the desired characteristics and/or benefits of the present subject matter or such individual features. One skilled in the art will appreciate that the disclosure may be used with many modifications or modifications of structure, arrangement, proportions, materials, components, and otherwise, used in the practice of the disclosure, which are particularly adapted to specific environments and operative requirements without departing from the principles or spirit or scope of the present disclosure. For example, elements shown as integrally formed may be constructed of multiple parts or elements shown as multiple parts may be integrally formed, the operation of elements may be reversed or otherwise varied, the size or dimensions of the elements may be varied.

Similarly, while operations or actions or procedures are described in a particular order, this should not be understood as requiring such particular order, or that all operations or actions or procedures are to be performed, to achieve desirable results. Additionally, other implementations are within the scope of the following claims. In some cases, the actions recited in the claims can be performed in a different order and still achieve desirable results. The presently disclosed embodiments are therefore to be considered in all respects as illustrative and not restrictive, the scope of the claimed subject matter being indicated by the appended claims, and not limited to the foregoing description or particular embodiments or arrangements described or illustrated herein. In view of the foregoing, individual features of any embodiment may be used and can be claimed separately or in combination with features of that embodiment or any other embodiment, the scope of the subject matter being indicated by the appended claims, and not limited to the foregoing description.

In the foregoing description and the following claims, the following will be appreciated. The phrases "at least one", "one or more", and "and/or", as used herein, are open-ended expressions that are both conjunctive and disjunctive in operation. The terms "a", "an", "the", "first", "second", etc., do not preclude a plurality. For example, the term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

The following claims are hereby incorporated into this Detailed Description by this reference, with each claim standing on its own as a separate embodiment of the present disclosure. In the claims, the term "comprises/comprising" does not exclude the presence of other elements, components, features, regions, integers, steps, operations, etc. Additionally, although individual features may be included in different claims, these may possibly advantageously be combined, and the inclusion in different claims does not imply that a combination of features is not feasible and/or advantageous. In addition, singular references do not exclude a plurality. Reference signs in the claims are provided merely as a clarifying example and shall not be construed as limiting the scope of the claims in any way.

What is claimed is:

1. A method of forming a tubing assembly of at least one tubing segment coupled to another tubing segment with a coupler join, said method comprising:
    seating ends of a first tubing segment and a second tubing segment within a mold such that a gap is formed between the first and second tubing segments, wherein the gap is aligned with a central molding region within the mold that is deeper than first and second molding regions in which the first tubing segment and the second tubing segment are seated, respectively;
    inserting a mandrel through the first tubing segment and the second tubing segment such that a portion of the mandrel extends across the gap between the first and second tubing segments;
    injecting flowable material into the gap between the first tubing segment and the second tubing segment; and
    curing the flowable material to form a coupler join joining the ends of the first tubing segment and the second tubing segment without extending over the exteriors of the first tubing segment and the second tubing segment;
    wherein the flowable material is selected such when the flowable material is cured it forms the coupler join having an inner diameter and an outer diameter that are substantially equal to the inner and outer diameters of the first and second tubing segments.

2. The method of claim 1, further comprising stretching the first tubing segment and the second tubing segment to fit over the mandrel.

3. The method of claim 1, further comprising positioning a circumferential gap of the mandrel in the gap between the first tubing segment and the second tubing segment.

4. The method of claim 1, further comprising selecting a depth of the central molding region based on a predetermined shrinkage of the flowable material from which the coupler join is formed.

5. The method of claim 1, wherein the step of seating the ends of the first tubing segment and the second tubing segment within the mold further comprises spacing apart the first and second tubing segments such that the gap between the first and second tubing segments allows sufficient flowable material to be injected therebetween to bond the tubing segments via the coupler join upon cooling of the flowable material.

6. The method of claim 1, further comprising selecting the flowable material to be the same as a material used to form the first and second tubing segments.

\* \* \* \* \*